(12) United States Patent
Wamprecht et al.

(10) Patent No.: US 6,458,898 B1
(45) Date of Patent: *Oct. 1, 2002

(54) TWO-COMPONENT POLYURETHANE COATING COMPOSITIONS CONTAINING POLYESTER POLYOLS AS A BINDER COMPONENT

(75) Inventors: Christian Wamprecht, Neuss; Michael Sonntag, Odenthal, both of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/329,109

(22) Filed: Oct. 25, 1994

(30) Foreign Application Priority Data

Nov. 3, 1993 (DE) ............................................... 4337432

(51) Int. Cl.$^7$ ........................... B32B 27/40; C08L 75/06
(52) U.S. Cl. ................. 525/440; 428/423.1; 428/425.8; 525/123; 525/127
(58) Field of Search ................................. 525/123, 127, 525/437, 440, 454; 528/48, 49, 81, 83, 84; 428/423.1, 425.8, 482

(56) References Cited

U.S. PATENT DOCUMENTS

| | | | | |
|---|---|---|---|---|
| 4,064,194 A | | 12/1977 | Evans et al. ............ 260/859 R |
| 4,112,017 A | * | 9/1978 | Howard ....................... 525/440 |
| 4,250,274 A | * | 2/1981 | Damico et al. ............. 525/440 |
| 4,393,186 A | * | 7/1983 | Damico et al. ................ 528/49 |
| 4,656,243 A | | 4/1987 | Pedain et al. ................ 528/302 |
| 4,692,384 A | | 9/1987 | Pedain et al. ............ 428/423.3 |
| 4,801,736 A | * | 1/1989 | Bagaglio et al. ............... 560/84 |
| 4,859,791 A | * | 8/1989 | Nodelman et al. ............. 560/90 |
| 4,894,430 A | | 1/1990 | Höhlein et al. ................ 528/75 |
| 5,260,138 A | | 11/1993 | Höhlein et al. ............. 428/480 |
| 5,319,056 A | | 6/1994 | Wamprecht et al. ........... 528/49 |

OTHER PUBLICATIONS

Eastman Kodak Company Material Data Sheet, Publication No. N–307B, "Eastman Resin Intermediates and their Performance Characteristics" for 1,4–cyclohexanedimethanol, Oct. 1991, 3 pages.*

* cited by examiner

Primary Examiner—Robert E. L. Sellers
(74) Attorney, Agent, or Firm—Joseph C. Gil; Thomas W. Roy

(57) ABSTRACT

Two-component polyurethane coating compositions containing wherein the binder contains polyisocyanates and certain polyester polyols having hydroxyl numbers of 80 to 250 prepared from a) polyol mixtures and b) aliphatic unsaturated dicarboxylic acids and, optionally, aliphatic saturated dicarboxylic acids, and their use for the production of coatings on plastic moldings such as those used in automobile construction.

8 Claims, No Drawings

TWO-COMPONENT POLYURETHANE COATING COMPOSITIONS CONTAINING POLYESTER POLYOLS AS A BINDER COMPONENT

BACKGROUND OF THE INVENTION

1. Field of the Invention

This invention relates to the two-component polyurethane coating compositions containing polyisocyanates and certain aliphatic polyester polyols as the binder and their use for coating flexible substrates, more particularly plastic moldings in automobile construction.

2. Description of the Prior Art

It has long been known that inflexible substrates, such as metals or wood, can be coated with two-component polyurethane coating compositions based on hydroxy-functional polyesters, polyethers or polyacrylates and organic polyisocyanates. The resulting coatings are distinguished in particular by excellent hardness, by very good adhesion and by high weather resistance. The chemical components of these coating compositions and coatings are described inter alia in "Lackkunstharze", Hans Wagner/Hans Friedrich Sarx, Carl Hanser Verlag, München, pages 153 to 173, 1971.

However, known two-component polyurethane coating compositions often give highly crosslinked lacquer coatings in which the elasticity and resistance to yellowing, particularly on exposure to short-wave UV light, often fail to satisfy the requirements that coatings for flexible substrates are expected to meet.

In automobile construction in particular, flexible plastic parts are being used to an increasing extent to improve safety. In some countries, for example, vehicles have to be fitted with fenders which are capable of withstanding impact against a fixed barrier without damage at a certain speed (for example 5 mph). Functional components, such as headlamps, indicator lamps, doors and hoods, must also remain operatively intact. In many countries the effect of these and other more exacting requirements has been that metal fenders are no longer used in automobile construction. They have been replaced by complete front and rear sections of high-flexibility materials that meet the need for damage-free restorability of the fender after impact (avoidance of damage in minor accidents).

High-flexibility plastics which have proved to be suitable for this particular application include semirigid elastomeric polyurethanes (such as those prepared from the Bayflex resins available from Bayer AG, Leverkusen). The elastomeric polyurethanes are produced from two-component polyurethane-forming mixtures by the reaction injection molding process in closed molds, optionally with foaming. Also suitable are thermoplastic polyurethanes (for example the Desmopan resins available from Bayer AG or the Texin resins available from Miles Inc., Pittsburgh, Pa.), which are processed by injection molding, and also various types of rubbers.

In the field of automotive construction, plastics based on these man-made materials which have been known for some years are relatively large and, hence, play a significant part in determining the appearance of the vehicle. For these reasons, the plastics used have to be coated. Another factor to be taken into account is that the surfaces of the plastics are degraded on weathering and, thus, have to be protected against the effects of weathering.

Unfortunately, elastic coatings are also required for plastic parts of low elasticity in order to prevent mechanical damage to the parts in question. For example, rigid but tough thermoplastics have to be coated with highly elastic, extremely resistant coating compositions to prevent cracks from developing in the coating in the event of mechanical damage or under the effect of other external influences and then spreading into the compact plastic.

It is possible using known two-component systems to produce highly flexible coating compositions which are totally adequate in terms of elasticity and flexibility at low temperatures. Such coating compositions use as the key polyol component certain polyhydroxyl polyesters which are predominantly synthesized from aliphatic diols and which also have a hydroxyl functionality of slightly above 2. The disadvantage of two-component polyurethane coating compositions based on these polyester diols and typical lacquer polyisocyanates lies in the fact that the coatings show inadequate water resistance and chalking resistance so that the gloss retention of coatings produced from these lacquer systems is totally inadequate. A particular disadvantage of these coating compositions is their tendency to yellow upon exposure to short-wave UV light. Another major disadvantage is that corresponding coatings lack tar stain resistance. This applies in particular to the systems described in DE-OS 3,421,122 which otherwise largely satisfy the above-mentioned requirements that elastic polymer coatings are expected to meet.

A significant improvement in the susceptibility of highly elastic polyurethane coatings to yellow upon exposure to short-wave UV light can be obtained with the polyester polyols described in EP-A 0,318,800. In addition, improvements in the tar stain resistance of the resulting polyurethane coatings can also be obtained with these polyester polyols, although these improvements are still not sufficient to meet present-day requirements.

Accordingly, an object of the present invention is to provide a new two-component polyurethane coating composition which satisfies the preceding requirements and which would be optimally suitable in particular for the coating of elastic plastic parts. The new coating composition should satisfy in particular the following requirements:

1. Film surfaces free from yellowing upon exposure to short-wave UV light: The coating should withstand exposure to short-wave UV light (wavelength <400 nm) for at least 200 hours without yellowing.
2. Low-temperature elasticity: The film should not crack under impact at the above-mentioned speeds, even at −15° C. The mechanical properties of the plastic should not be affected by the coating.
3. Resistance to tar stains: The coating should withstand exposure to a special tar-containing test solution without damage.
4. Good gloss retention:
   The coating on the plastic parts should be highly durable. It should not degrade any more quickly under the effect of weathering than coatings on bodywork.
5. No post-embrittlement on weathering: The coating should not undergo post-embrittlement, even after prolonged weathering, i.e., it should retain its elasticity at low temperatures, even during weathering.

6. Low drying temperature: The heat resistance of large plastic parts of the type in question is limited. For this reason, the necessary drying temperatures and times should be as low and as short as possible both for this reason and for reasons of saving energy.

7. Reparability: The drying conditions of such a system should allow not only for initial (OEM) coating but also for repair coating at 80° C. or room temperature.

It has now surprisingly been found that these objects can be achieved and, in particular, coatings resistant to tar stains can be obtained by using the polyester polyols according to the invention, based on the starting materials described in more detail hereinafter, as the polyhydroxyl component or as the essential part of the polyhydroxyl component in two-component polyurethane coating compositions.

SUMMARY OF THE INVENTION

The present invention relates to two-component polyurethane coating compositions, which are suitable for the production of flexible coatings on plastic moldings, wherein the binders contain one or more lacquer polyisocyanates and a polyol component containing one or more polyester polyols which have a hydroxyl number of 80 to 250 and are the reaction products of a) 52 to 60 mol-% of a polyol component containing i) 5 to 50 mol-% of one or more dihydric aliphatic alcohols having at least 2 carbon atoms other than neopentyl glycol, ii) 5 to 40 mol-% of one or more at least trihydric aliphatic alcohols having at least 3 carbon atoms, iii) 0 to 9 mol-% of one or more diols containing cycloaliphatic units and iv) 20 to 90 mol-% of neopentyl glycol, and b) 40 to 48 mol-% of a dicarboxylic acid component containing v) 0 to 49.9% by weight of one or more aliphatic saturated dicarboxylic acids or dicarboxylic anhydrides containing at least two carbon atoms and vi) 50.1 to 100 mol-% of one or more aliphatic unsaturated dicarboxylic acids. or dicarboxylic anhydrides containing at least 4 carbon atoms, wherein the percentages set forth in a) and b) add up to 100.

The present invention also relates to the use of these coating compositions for coating flexible substrates, more particularly plastic moldings in automobile construction.

DETAILED DESCRIPTION OF THE INVENTION

Although DE-OS 4,100,204 describes polyester polyols which are very similar to the polyester polyols to be used in accordance with the invention, it only mentions their use in combination with amino resins or blocked polyisocyanates in one-component stoving compositions. Accordingly, there is nothing in this document to suggest that the polyester polyols would be ideally suitable as the polyol component in two-component polyurethane coating compositions for highly flexible substrates.

Applicants' German Patent Application P 42 17 363.9 also relates to polyester polyols based on aliphatic starting materials and to their use in two-component polyurethane coating compositions for highly flexible substrates.

However, the polyester polyols mentioned in the German patent application differ from those used in accordance with the present invention in regard to the content of cycloaliphatic diols in polyol component a).

The particular suitability of the polyester polyols for use in accordance with the invention is attributable to the choice of the starting materials on which the polyester polyols are based and the quantities in which they are used. The polyester polyols have hydroxyl numbers of 80 to 250, preferably 120 to 200; acid values below 12, preferably 0.5 to 10; and a number average molecular weight, which may be calculated from the stoichiometry of the starting materials, of 800 to 10,000, preferably 800 to 5,000.

The polyester polyols according to the invention are highly viscous, colorless clear resins which form clear solutions in such lacquer solvents, for example, hydrocarbons such as toluene, xylene or higher alkylbenzenes; esters such as ethyl acetate, butyl acetate, methylglycol acetate, ethylglycol acetate or methoxypropyl acetate; ketones such as methylethyl ketone or methylisobutyl ketone; and mixtures of these solvents.

The polyester polyols according to the invention are produced from selected synthesis components a) and b) mentioned above. Polyol component a) is made up of individual constituents (i) to (iv).

Component (i) is selected from dihydric aliphatic alcohols containing at least 2, preferably 2 to 6 carbon atoms, other than neopentyl glycol. Examples include ethylene glycol, propane-1,2- and -1,3-diol, butane-1,2- and -1,4-diol, pentane-1,5-diol and, more preferably, hexane-1,6-diol. Mixtures of these diols may also be used as component (i). Component (i) is used in a quantity of 5 to 50 mol-%, preferably 5 to 45 mol-% and more preferably 5 to 40 mol-%, based on the total quantity of component a).

Component (ii) is selected from aliphatic alcohol having a functionality of at least 3 and containing at least 3, preferably 3 to 6 carbon atoms. Examples include trimethylol propane, glycerol and/or pentaerythritol. Component (ii) is used in quantity of 5 to 40 mol-%, preferably 10 to 35 mol-% and more preferably 15 to 30 mol-%, based on the total quantity of component a).

Component (iii) is selected from diols having (cyclo) aliphatically bound hydroxyl groups and containing 6 to 15 carbon atoms and at least one cyclohexane ring. Examples include cycloalkanediols, such as 1,2-1,3- and 1,4-cyclohexanediol, 2,2-bis-(4-hydroxycyclohexyl)-propane, and 1,2-, 1,3- and, in particular, $_1$, 4-bis-(hydroxymethyl)-cyclohexane. Component (iii) is used in a quantity of 0 to 9 mol-%, preferably 0 to 7.5 mol-% and more preferably 0 to 5 mol-%, based on the total quantity of component a).

Component (iv) is neopentyl glycol (2,2-dimethylpropane-1,3-diol). Component (iv) is used in quantity of 20 to 90 mol-%, preferably 30 to 85 mol-% and more preferably 40 to 80 mol-%, based on the total quantity of component a).

Dicarboxylic acid component b) is a mixture of components (v) and (vi). The mixture contains 0 to 49.9 mol-%, preferably 10 to 45 mol-% and more preferably 15 to 45 mol-% of component (v) and 50.1 to 100 mol-%, preferably 55 to 90 mol-% and more preferably 55 to 85 mol-% of component (vi), based on the total quantity of component b).

Component (v) selected from aliphatic saturated dicarboxylic acids containing at least 2, preferably 4 to 6 carbon atoms. Examples include oxalic acid, succinic acid, glutaric acid and, in particular, adipic acid. Mixtures of these acids may also be used. The use of intramolecular anhydrides of these acids is also possible, but not preferred.

Component (vi) is selected from aliphatic, unsaturated dicarboxylic acids or anhydrides containing at least 4, preferably 4 to 5 carbon atoms. Examples include fumaric acid, maleic acid or itaconic acid and their anhydrides. In a particularly preferred embodiment, maleic anhydride is used as component (vi). Mixtures of these acids and/or anhydrides may also be used as component (vi).

The percentages set forth regarding the constituents of components a) and b) add up to 100. To prepare the polyester resins component a) is present in a quantity of 52 to 60 mol-%, preferably 52 to 58 mol-%, and component b is present in a quantity of 40 to 48 mol-%, preferably 42 to 48 mol-%, wherein the percentages set forth add up to 100.

The polyesters are produced in known manner by the methods described in detail, for example, in Ullmanns, "Encyclopädie der technischen Chemie", Verlag Chemie Weinheim, 4th Edition (1980), Vol. 19, pages 61 et seq. or by H. Wagner and H. F. Sarx in "Lackkunstharze", Carl Hanser Verlag, München (1971), pages 86 to 152. The esterification is optionally carried out in the presence of a catalytic quantity of a typical esterification catalyst such as acids, bases or transition metal compounds (for example, titanium tetrabutylate) at temperatures of about 80 to 260° C., 100 to 230° C. The esterification reaction is continued until the required hydroxyl and acid numbers are obtained.

In the coating compositions according to the invention, the polyester polyols are optionally used in admixture with other organic polyhydroxyl compounds known from polyurethane coating technology. These other polyhydroxyl compounds include the known polyester, polyether or polyacrylate polyols. The known polyacrylate polyols from the prior art are preferably used as the other organic polyhydroxyl compounds, if any, in addition to the previously described polyester polyols.

These polyacrylate polyols are copolymers which are soluble in previously described lacquer solvents and prepared from 2-hydroxyethyl and/or hydroxypropyl (meth)acrylate (isomer mixture as obtained by the addition of propylene oxide to (meth)acrylic acid) with other olefinically unsaturated monomers such as butyl acrylate, methyl methacrylate, styrene, acrylic acid, acrylonitrile and methacrylonitrile. The hydroxyl group content of these polyacrylate polyols is generally between 1 and 5% by weight.

The polyester polyols, which are critical to the invention, may be used in admixture with up to 90 hydroxyl equivalent-%, preferably up to 50 hydroxyl equivalent-%, based on all the polyhydroxyl compounds, of the other polyols previously described. However, the polyester polyols according to the invention are preferably used as the sole polyol component in the coating compositions according to the invention.

Reactants for the polyol component are the known "lacquer polyisocyanates," i.e., the known polyisocyanate adducts preferably urethane-modified or, more preferably, biuret or isocyanurate-modified polyisocyanates preferably prepared from diisocyanates such as 1,6-diisocyanatohexane, 1-isocyanato-3,3,5-trimethyl-5-isocyanatomethyl cyclohexane (isophorone diisocyanate), 2,4-diisocyanatotoluene and mixtures thereof with up to 35% by weight, based on the total mixture, of 2,6-diisocyanatotoluene, and mixtures of these diisocyanates. In a particularly preferred embodiment, the "lacquer polyisocyanates" contain aliphatically and/or cycloaliphatically bound isocyanate groups.

"Lacquer polyisocyanates" containing urethane groups include in particular the reaction products of 2,4- and optionally 2,6-diisocyanato-toluene with less than equivalent quantities of trimethylol propane or mixtures thereof with simple diols such as the isomeric propane or butanediols. The production of urethane-modified lacquer polyisocyanates is described, for example, in DE-PS 1,090,196.

The biuret-modified lacquer polyisocyanates, which are particularly preferred according to the invention, include those prepared from 1,6-diisocyanatohexane as described, for example, in EP-BI 0,003,505, DE-PS 1,101,394, U.S. Pat. No. 3,358,010 and U.S. Pat. No. 3,903,127.

The equally preferred isocyanurate-modified lacquer polyisocyanates include, in particular, the trimers and mixed trimers of the diisocyanates set forth above. Examples include the isocyanurate polyisocyanates based on diisocyanatotoluene according to GB-PS 1,060,430, GB-PS 1,506,373 or GB-PS 1,485,564; the mixed trimers of diisocyanatotoluene with 1,6-diisocyanatohexane obtained, for example, in accordance with DE-PS 1,644,809 and DE-OS 3,144,672; and, in particular, the aliphatic or aliphatic cycloaliphatic trimers or mixed trimers based on 1,6-diisocyanatohexane and or isophorone diisocyanate obtained, for example, in accordance with U.S. Pat. Nos. 4,324,879, 4,288,586, DE-OS 3,100,262, DE-OS 3,100,263, DE-OS 3,033,860 and DE-OS 3,144,672. The lacquer polyisocyanates used according to the invention generally have an isocyanate content of 5 to 25% by weight and a residual content of the monomeric diisocyanates used for their production of preferably less than 2% by weight. Mixtures of the previously described lacquer polyisocyanates may also be used.

The polyol component and the polyisocyanate component of the two-component polyurethane coating compositions according to the invention are present in quantities corresponding to an equivalent ratio of isocyanate groups to hydroxyl groups of 5:1 to 1:2, preferably 1.5:1 to 1:1.2. The two-component binders obtained by mixing the two components have only a limited pot life of about 2 to 48 hours and may be either processed as such (i.e., solvent-free clear coating compositions), or preferably in conjunction with known additives. These optional additives may be added either to the mixture or to the individual components before they are mixed.

Suitable additives include solvents such as ethyl acetate, butyl acetate, methylethyl ketone, methylisobutyl ketone, ethylene glycol monoethylether acetate, methoxypropyl acetate, toluene, xylene, white spirit and mixtures of these solvents. The solvents are used in a quantity of up to 70% by weight, preferably up to 40% by weight, based on the weight of the coating composition.

Other optional additives include plasticizers such as tricresyl phosphate, phthalic acid diesters or chloroparaffins; pigments and fillers such as titanium dioxide, barium sulfate, chalk and carbon black; catalysts such as N,N-dimethylbenzylamine, N-methyl morpholine, zinc octoate, tin(ll) octoate or dibutyl tin dilaurate; flow control agents; thickeners, optionally stabilizers, such as substituted phenols; organofunctional silanes as coupling agents; light stabilizers; and UV absorbers.

Suitable light stabilizers include the sterically hindered amines described, for example, in DE-OS 2, 417,353 (=U.S. Pat. No. 4,123,418 and U.S. Pat. No. 4,110,304) and in DE-OS 2,456,864 (=U.S. Pat. No. 3,993,655 and U.S. Pat. No. 4,221,701). Particularly preferred compounds are bis-(1,2,2,6,6-penta-methylpiperid-4-yl)-sebacate, bis-(2,2,6,6-tetramethylpiperid-4-yl)-sebacate, and n-butyl-(3,5-ditert.butyl-4-hydroxybenzyl)-malonic acid bis-(1,2,2,6,6-pentamethylpiperid-4-yl)-ester.

The moisture adhering to the fillers and pigments may be removed by preliminary drying or by the use of water-absorbing substances, such as molecular sieve zeolites.

The coatings obtained from the coating compositions according to the invention may be dried at room temperature and do not require higher drying temperatures to develop the optimal properties mentioned at the beginning. However, due to the relatively slow drying at room temperature, an increase in temperature to about 60 to 120° C., preferably about 80 to 100° C., for a period of 20 to 40 minutes is often advisable. Although a higher drying temperature and hence a shorter stoving time are possible, the shape of the plastic parts coated with the coating compositions may be distorted under such conditions.

The coating compositions used in accordance with the invention are especially suited for coating plastics, although they may also be used for metals and other substrates. The coating compositions may be used with particular advantage for coating the flexible plastic parts used in automobile construction.

Because the coating compositions are equally suitable for coating plastics and metals, they are also eminently suitable in particular for coating the exterior parts of automobiles produced from plastic and metal parts by the modem mixed construction method. The particular advantages of the coating compositions used in accordance with the invention are favorable for this on-line coating of exterior parts of automobiles because the coatings can be cured at low temperatures so that the plastics are not overly exposed to heat and because the resulting coatings combine excellent weathering resistance with elasticity so that decorative coatings remain intact for long periods and safely withstand impact stresses without damage. The excellent resistance to chipping of automobile coatings produced in accordance with the invention is also emphasized in this regard.

However, the most important and the most crucial improvement over the prior art obtained by the coatings of the present invention is their excellent resistance to tar stains which, as is clearly apparent from the comparison examples, is attributable to the choice of special monomers in the production of the polyester polyol component.

The coatings obtained from the two-component coating compositions of the present invention optimally satisfy two basically conflicting requirements, namely excellent elasticity at low temperatures coupled with high gloss retention and resistance to yellowing upon exposure to light of low wavelength, such as short-wave UV light.

The coating compositions of the present invention may be applied to the substrates to be coated by any of the methods typically used in coatings technology, e.g., spread coating, spray coating or dip coating. The coating compositions according to the invention are suitable both for the production of base coats, intermediate coats and for the production of top coats on the substrates to be coated.

The invention is illustrated by the following examples in which all parts and percentages are by weight unless otherwise indicated.

EXAMPLES

General procedure for the production of the polyester polyols

The polyols and the unsaturated dicarboxylic acid(s)/anhydride(s) were weighed into a reactor equipped with a stirrer, heating system, automatic temperature control, column and receiver, and heated to 100 to 150° C. while a stream of nitrogen was passed through the inhomogeneous mixture of raw materials. After the remaining dicarboxylic acids had been added, the mixture of raw materials was heated with stirring to 200° C. over a period of 4 to 8 hours during which time nitrogen was passed through the mixture. The temperature measured at the head of the column was kept at a maximum of 105° C. The melt became homogeneous and clear. When the head temperature exceeded 90° C., the column was removed and condensation was completed with an increased stream of nitrogen to an acid value of <5 mg KOH/g substrate.

Colorless resins were obtained and were dissolved in methoxypropyl acetate or butyl acetate or mixtures thereof.

The composition and the characteristic data of the individual polyesters obtained in accordance with this method are set forth in Examples 1 to 8. As can be seen from the quantities shown in "g", the quantities in "mols" were not based on the actual numbers of "mols", but instead on the molar ratio. The hydroxyl and acid values were expressed in "mg KOH/g".

| Polyester of | Quantity weighed in |
|---|---|
| Example 1 (Invention) | |
| 2.0 Mol ethane-1,2-diol | 585 g |
| 1.0 Mol trimethylol propane | 651 g |
| 2.5 Mol neopentyl glycol | 1273 g |
| 1.6 Mol adipic acid | 1149 g |
| 2.0 Mol maleic anhydride | 1379 g |
| Hydroxyl value: 154 | |
| Acid value: 1.9 | |
| Example 2 (Invention) | |
| 1.0 Mol hexane-1,6-diol | 282 g |
| 2.0 Mol trimethylol propane | 645 g |
| 0.7 Mol 1,4-bis-(hydroxymethyl)-cyclohexane | 231 g |
| 6.4 Mol neopentyl glycol | 1584 g |
| 2.9 Mol adipic acid | 993 g |
| 5.3 Mol maleic anhydride | 1236 g |

| Polyester of | Quantity weighed in |
|---|---|
| Hydroxyl value: 168 | |
| Acid value: 3.5 | |
| Example 3 (Invention) | |
| 0.5 Mol hexane-1,6-diol | 287 g |
| 1.0 Mol trimethylol propane | 652 g |
| 3.5 Mol neopentyl glycol | 1774 g |
| 1.4 Mol adipic acid | 1009 g |
| 2.6 Mol maleic anhydride | 1258 g |
| Hydroxyl value: 156 | |
| Acid value: 1.8 | |
| Example 4 (Invention) | |
| 2.2 Mol ethane-1,2 diol | 672 g |
| 1.0 Mol trimethylol propane | 657 g |
| 0.3 Mol 1,4-bis-(hydroxymethyl)-cyclohexane | 198 g |
| 2.0 Mol neopentyl glycol | 1002 g |
| 1.4 Mol adipic acid | 969 g |
| 3.2 Mol maleic anhydride | 1521 g |
| Hydroxyl value: 154 | |
| Acid value: 4.1 | |
| Example 5 (Invention) | |
| 1.0 Mol hexane-1,6-diol | 282 g |
| 2.0 Mol trimethylol propane | 639 g |
| 0.8 Mol 1,4-bis-(hydroxymethyl)-cyclohexane | 258 g |
| 6.3 Mol neopentyl glycol | 1554 g |
| 3.2 Mol adipic acid | 1122 g |
| 4.8 Mol maleic anhydride | 1131 g |
| Hydroxyl value: 157 | |
| Acid value: 3.2 | |
| Example 6 (Invention) | |
| 1.0 Mol ethane-1,2-diol | 276 g |
| 1.1 Mol trimethylol propane | 627 g |
| 3.7 Mol neopentyl glycol | 1704 g |
| 1.7 Mol adipic acid | 1098 g |
| 3.0 Mol maleic anhydride | 1305 g |
| Hydroxyl value: 159 | |
| Acid value: 1.6 | |

EXAMPLE 7 (Comparison)

The following comparison example differs from the examples according to the invention in the use of a quantity of cycloaliphatic diol (iii) which is outside the scope of the present invention.

| Polyester of | Quantity weighed in |
|---|---|
| 1.0 Mol hexane-1,6-diol | 522 g |
| 1.0 Mol trimethylol propane | 593 g |
| 1.5 Mol 1,4-bis-(hydroxymethyl)-cyclohexane | 956 g |
| 1.5 Mol neopentyl glycol | 692 g |
| 2.4 Mol adipic acid | 1552 g |
| 1.5 Mol maleic anhydride | 695 g |
| Hydroxyl value: 150 | |
| Acid value: 1.4 | |

EXAMPLE 8 (Comparison)

The following comparison example differs from the examples according to the invention because the molar ratio between the two acid components which is outside the scope of the present invention.

| Polyester of | Quantity weighed in |
|---|---|
| 2.0 Mol ethane-1,2-diol | 567 g |
| 1.0 Mol trimethylol propane | 630 g |
| 2.5 Mol neopentyl glycol | 1236 g |
| 2.7 Mol adipic acid | 1845 g |
| 1.8 Mol maleic anhydride | 825 g |
| Hydroxyl value: 147 | |
| Acid value: 1.3 | |

EXAMPLE 9 (Use)

This example describes the production of ready-to-use coating compositions based on the polyester polyols of Examples 1 to 8, the application and curing of these compositions and the testing of the resulting coatings.

White coating compositions were prepared to evaluate the general coating properties. The polyester polyols of Examples 1 to 8 were provided mixed with various additives and white pigments and ground on a Red Devil grinder. A lacquer polyisocyanate was then added at an NCO:OH ratio of about 1.2:1.

The "lacquer polyisocyanate" used was an isocyanurate-modified polyisocyanate prepared from 1,6-diisocyanatohexane and present as a 90% solution in a 1:1 volume ratio of butyl acetate/solvent naphtha 100, NCO content of the solution 19.4% by weight (Desmodur N 3390, a product of Bayer AG).

Based on solid resin (total of solid constituents of polyol and polyisocyanate), the following quantities of additives were used:

TABLE 1

| Constituents | % by weight solid-on-solid |
|---|---|
| Zinc octoate (10% in 1-methoxypropyl-2-acetate) | 0.2 |
| Silicone oil as flow control agent (Baysilon-Lackadditiv OL 17, a product of Bayer AG, 10% in 1-methoxypropyl-2-acetate) | 0.1 |
| Tinuvin 292 (a light stabilizer of Ciba-Geigy, Basel; 10% in xylene) | 1.0 |
| Tinuvin 900 (a light stabilizer of Ciba-Geigy, Basel; 10% in xylene) | 1.0 |
| Titanium dioxide (rutile, Kronos 2160, a product of Kronos-Titan, Leverkusen) | 60.00 |
| Antisedimenting agent (Bentone 38, a product of Kronos-Titan, Leverkusen; 10% suspension in a 17:1 blend of Solvesso solvent/Antiterra U additive) | 1.0 |

The lacquer was diluted to a content of

33% by weight of binder

20% by weight of pigment approx. 1% by weight of additives approx. 46% by weight of solvent.

The solvent used was a mixture of ethyl acetate, 1-methoxypropyl-2-acetate and methylethyl ketone (1:1:1).

The flow time (DIN 53 211; 4 mm orifice) was approximately 18 seconds. The coating compositions were thus ready for spraying. The pot life in sealed containers was about 60 to 80 hours.

The coating compositions were sprayed onto glass plates (wet film thickness approximately 100 μm), dried for 45 minutes at 80° C. and stored for 14 days at room temperature. The dry film thickness was approximately 50 μm.

König hardness (DIN 53 157), Gardner gloss at an angle of 60° (DIN 67 530), dissolvability by various solvents and resistance to tar were then tested. The resistance of the coatings to tar stains is the crucial test criterion for the invention.

The coating compositions were also tested for low-temperature flexibility by spraying onto previously primed, 3 mm thick plastic plates of Bayflex 91 (a product of Bayer AG, Leverkusen), drying for 45 minutes at 80° C. and storing for 14 days at room temperature; the dry film thickness was approximately 35 μm.

2 cm wide and 15 cm long strips prepared from the plastic plates were stored at various temperatures (room temperature, 5° C., 0° C., −5° C., . . . , −40° C.) for about 30 minutes in a low-temperature test chamber and then bent around a 1 inch mandrel at the particular temperature prevailing in the chamber. The temperature at which the coating cracked is the value used for low-temperature flexibility. The coatings produced from the polyester polyols of Examples 1 to 8 satisfied stringent elasticity requirements, even at low temperatures.

The test results of the coatings based on the polyester polyols of Examples 1 to 8 are set forth in Table 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component polyurethane coating composition, which is suitable for the production of a flexible coating on plastic moldings, wherein the binder comprises one or more lacquer polyisocyanates and a polyol component containing one or more polyester polyols which have a hydroxyl number of 80 to 250 and are the reaction products of a) 52 to 60 mol-% of a polyol component comprising
   i) 5 to 50 mol-% of one or more dihydric aliphatic alcohols having at least 2 carbon atoms other than neopentyl glycol,
   ii) 5 to 40 mol-% of one or more at least trihydric aliphatic alcohols having at least 3 carbon atoms,
   iii) 0 to 9 mol-% of one or more diols containing cycloaliphatic units and
   iv) 20 to 90 mol-% of neopentyl glycol, and b) 40 to 48 mol-% of a dicarboxylic acid component comprising
   v) 0 to 49.9% by weight of one or more aliphatic saturated dicarboxylic acids or dicarboxylic anhydrides containing at least two carbon atoms and

TABLE 2

Test results of coatings based on the polyesters of Examples 1 to 8 and an isocyanurate group-containing polyisocyanate as crosslinking agent

| | | Coating based on the polyester of Example No. | | | | | | | |
|---|---|---|---|---|---|---|---|---|---|
| | | 1 | 2 | 3 | 4 | 5 | 6 | Comp. 7 | Comp. 8 |
| Pendulum hardness (s) | | 74 | 81 | 64 | 94 | 68 | 115 | 53 | 44 |
| Gardner gloss, 60° | | 91 | 90 | 91 | 91 | 90 | 91 | 86 | 89 |
| Dissolvability by | xylene | 0 | 0 | 0 | 0 | 0 | 0 | 1 | 0–1 |
| | acetone | 1 | 1 | 1 | 1 | 1 | 1 | 3 | 2 |
| | methoxy-propyl acetate | 0 | 0 | 0 | 0 | 0 | 0 | 1 | 1 |
| Contact time 1 minute | | | | | | | | | |
| Tar resistance[1] after a contact time of | 1 h | 0 | 0 | 0 | 0 | 0 | 0 | 1 | 0–1 |
| | 3 h | 0 | 0 | 0 | 0 | 0 | 0 | 1 | 1 |
| | 8 h | 0 | 0 | 0 | 0 | 0 | 0 | 2 | 1–2 |
| | 24 h | 0 | 0 | 0–1 | 0 | 0–1 | 0–1 | 2 | 2 |
| Solution: DBL 7399[2] | | | | | | | | | |
| Low-temperature flexibility | | −25° C. | −20° C. | −25° C. | −25° C. | −25° | −20° C. | −30° C. | −30° C. |

[1] 0 = best value, 5 = worst value
[2] Special tar solution of Daimler Benz AG for determining the tar resistance of automobile coatings Discussion of the results:

Highly flexible coatings were obtained with all the coating compositions based on the polyesters of Examples 1 to 8. The results of the tar resistance test reflect the excellent tar resistance of the coatings of Examples 1 to 6 according to the invention in contrast to comparison lacquers 7 and 8. This effect was also reflected in resistance to various solvents. Another advantage of coating compositions 1 to 6 according to the invention lies in the considerably higher pendulum hardnesses of the coatings in relation to the coatings obtained from the comparison coating compositions.

vi) 50.1 to 100 mol-% of one or more aliphatic unsaturated dicarboxylic acids or dicarboxylic anhydrides containing at least 4 carbon atoms,
wherein the percentages set forth in a) and b) add up to 100.

2. The coating composition of claim 1 wherein component iii) is present in an amount of 0 to 7.5 mol-%.

3. The coating composition of claim 1 wherein component iii) is present in an amount of 0 to 5 mol-%.

4. A coated substrate which is prepared by coating a substrate with a two-component polyurethane coating composition, which is suitable for the production of a flexible coating on plastic moldings, wherein the binder comprises one or more lacquer polyisocyanates and a polyol component containing one or more polyester polyols which have a hydroxyl number of 80 to 250 and are the reaction products of a) 52 to 60 mol-% of a polyol component comprising

- i) 5 to 50 mol-% of one or more dihydric aliphatic alcohols having at least 2 carbon atoms other than neopentyl glycol,
- ii) 5 to 40 mol-% of one or more at least trihydric aliphatic alcohols having at least 3 carbon atoms,
- iii) 0 to 9 mol-% of one or more diols containing cycloaliphatic units and
- iv) 20 to 90 mol-% of neopentyl glycol, and b) 40 to 48 mol-% of a dicarboxylic acid component comprising
- v) 0 to 49.9% by weight of one or more aliphatic saturated dicarboxylic acids or dicarboxylic anhydrides containing at least two carbon atoms and
- vi) 50.1 to 100 mol-% of one or more aliphatic unsaturated dicarboxylic acids or dicarboxylic anhydrides containing at least 4 carbon atoms, wherein the percentages set forth in a) and b) add up to 100.

5. The coated substrate of claim 4 wherein component iii) is present in an amount of 0 to 7.5 mol-%.

6. The coated substrate of claim 4 wherein component iii) is present in an amount of 0 to 5 mol-%.

7. The coated substrate of claim 4 wherein the substrate is a plastic molding.

8. The coated substrate of claim 4 wherein the substrate is a composite construction of a metal and a flexible plastic.

* * * * *